(12) United States Patent
Nakamura et al.

(10) Patent No.: US 6,466,519 B1
(45) Date of Patent: Oct. 15, 2002

(54) ELECTRONIC DEVICE, ELECTRONIC TIMEPIECE AND POWER CONTROL METHOD

(75) Inventors: Hidenori Nakamura; Kunio Koike, both of Matsumoto; Eisaku Shimizu, Okaya, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/601,800

(22) PCT Filed: Nov. 17, 1999

(86) PCT No.: PCT/JP99/06426

§ 371 (c)(1),
(2), (4) Date: Aug. 3, 2000

(87) PCT Pub. No.: WO00/35062

PCT Pub. Date: Jun. 15, 2000

(30) Foreign Application Priority Data

Dec. 4, 1998 (JP) ............................................. 10-345540

(51) Int. Cl.[7] ............................. G04B 3/00; G04B 9/00; G04C 3/00
(52) U.S. Cl. ............................. 368/64; 368/66; 368/204
(58) Field of Search .................... 368/64, 66, 203–205; 320/103, 107

(56) References Cited

U.S. PATENT DOCUMENTS 4,634,953 A * 1/1987 Shoji et al. ................. 368/205
4,653,931 A 3/1987 Takeda
4,730,287 A * 3/1988 Yoshino et al. ............. 368/205

FOREIGN PATENT DOCUMENTS

| JP | 62-66189 | 3/1987 |
| JP | 1-114333 | 5/1989 |
| JP | 3-117333 | 12/1991 |
| JP | 4-50550 | 8/1992 |
| JP | 10-201128 | 7/1998 |

* cited by examiner

Primary Examiner—Vit Miska (57) ABSTRACT

An electronic apparatus includes a power generator (20) as a power supply, a capacitor (30) for accumulating generated power, a logic circuit (170) driven by the power from the capacitor, and a power supply cut-off circuit (31). When the power generator starts operating, the power supply cut-off circuit (31) does not supply power to the logic circuit (170) until a voltage of the capacitor (30) reaches a preset voltage. When the voltage of the capacitor (3) becomes equal to or greater than the preset voltage, power is supplied from the capacitor to the logic circuit. Accordingly, a leakage current when power generation starts is prevented, and most of the generated power is accumulated in the capacitor. The capacitor, can rapidly accumulate electricity, and the time until activation of an electronic circuit driven by the capacitor is reduced.

13 Claims, 9 Drawing Sheets

ELECTRONIC DEVICE, ELECTRONIC TIMEPIECE AND POWER CONTROL METHOD

TECHNICAL FIELD

The present invention relates to an electronic apparatus, to an electronically-controlled timepiece having the same, and to a power supply control method.

BACKGROUND ART

Concerning an electronically-controlled mechanical timepiece for displaying accurate time, there is a known timepiece described in Japanese Unexamined Patent Application Publication No. 8-5758. In this timepiece, mechanical energy when releasing a spring is converted into electrical energy by a power generator. A rotation control unit is activated by the electrical energy, and a current value flowing through a coil of the power generator is controlled. Hence, hands fixed to a wheel train are accurately driven, thus displaying accurate time.

In this timepiece, the electrical energy from the power generator, that is, the power supply for supplying electrical energy, is supplied to a capacitor once, and power from the capacitor is employed to drive the rotation control unit. Since AC electromotive force in synchronism with a rotation period of the power generator is input to the capacitor, it is not necessary to store power for enabling the rotation control unit provided with an IC (an electronic circuit and a logic circuit) and an oscillation circuit (quartz crystal oscillator) to operate for a long period of time. Hence, a capacitor with a relatively small capacitance, such as a 10 μF capacitor, capable of operating the IC and the oscillation circuit for a few seconds is employed.

This electronically-controlled mechanical timepiece does not require a motor since it uses the spring as a power source for driving the hands. Therefore, the characteristics of the timepiece are that it requires a few components and is inexpensive. In addition, it is only necessary to generate small electrical energy for driving the electronic circuit. The timepiece can be operated by small input energy.

However, this conventional electronically-controlled mechanical timepiece has drawbacks as follows. Specifically, when performing time adjustment (hands adjustment) which is generally performed by pulling out a crown, hands for hour, minute, and second are stopped so that the time can be accurately adjusted. Since stopping the hands would mean stopping the wheel train, the power generator is also stopped.

Therefore, the input of electromotive force from the power generator to the capacitor is stopped. In contrast, the IC and the oscillation circuit are continuously driven. Electrical charges accumulated in the capacitor are discharged to the IC side, thus reducing a terminal voltage. As a result, the rotation control unit, that is, the oscillation circuit or the like, is also stopped.

When the IC stops oscillating, power consumption is reduced, thus significantly slowing down voltage reduction in the capacitor. When a user has trouble in adjusting the time, and a voltage of the capacitor is reduced below an oscillation stopping voltage, the capacitor is often at a voltage of approximately 0.3 to 0.4 V which is slightly smaller than the oscillation stopping voltage. When the time adjustment (hands adjustment) is performed for a very long period of time, such as for more than several tens of minutes, the capacitor may completely discharge, and the voltage may be reduced to "0".

When the hands adjustment is completed and the crown is pushed in, thus starting rotation of the power generator, some time is required to boost the voltage of the capacitor by a charging current of the power generator and to cause the oscillation circuit and the IC to start operating. In particular, when a generated current is small, power is consumed by a leakage in the IC, and the voltage of the capacitor is not increased. Hence, the system is not promptly started. This results in taking time to start brake control and to perform time control. Although the time adjustment (hands adjustment) is performed, there is an error in the designated time.

Besides the electronically-controlled mechanical timepiece, a self-winding generating-type timepiece for moving an oscillating weight and generating power, and an electrically-controlled timepiece, such as a solar rechargeable-type timepiece, provided with various generators (power supplies) have a similar problem. When a power generator is stopped upon hands adjustment, and when a capacitor is discharged, some time is required to activate electronic circuits due to a leakage in the IC or the like, even when the power generator is activated.

Besides the electrbnically-controlled timepiece, there are various electronic apparatuses provided with a power generator (power supply), a capacitor, and electronic circuits such as an IC and an oscillation circuit. In addition, there are various electrical apparatuses provided with, instead of a power generator, a power supply such as a commercial power supply or a car battery. Concerning these electrical apparatuses, there is a problem in that, when the power supply starts operating, that is, when the power generator is started or when power is first supplied from the power supply, some time is required to activate the IC and the oscillation circuit, due to a leakage in the IC or the like.

It is an object of the present invention to provide an electronic apparatus, an electronically-controlled timepiece, and a power supply control method in which electronic circuits, such as an IC and an oscillation circuit, are rapidly activated when a power supply starts operating.

DISCLOSURE OF INVENTION

An electronic apparatus according to the present invention, including a power supply, a capacitor for accumulating power from the power supply, and an electronic circuit driven by the power from the capacitor, comprises a power supply control unit for not supplying the power from the capacitor to the electronic circuit until a voltage of the capacitor reaches a preset voltage, and for supplying the power from the capacitor to the electronic circuit when the voltage of the capacitor becomes equal to or greater than the preset voltage.

According to the present invention, the power supplied from the power supply, such as a power generator, is accumulated in the capacitor. Since the power supply control unit controls the power not to be supplied from the capacitor to the electronic circuit until the voltage of the capacitor reaches the preset value, a leakage current is not generated, which is part of the power supplied from the power supply flowing into the electronic circuit. Most of the supplied power (generated power or the like) can be supplied to the capacitor. Therefore, the time required to increase the voltage of the capacitor so as to reliably activate the electronic circuit, such as an IC, is reduced. The time until activation of the electronic circuit, such as the IC or an oscillation circuit, is reduced.

Due to characteristics of a quartz crystal oscillator, the quartz crystal oscillator oscillates more readily when a rapidly-changing voltage is suddenly applied, compared to when a gradually-increasing voltage is applied. In other words, the quartz crystal oscillator can oscillate even at a low voltage. By applying the voltage of the capacitor that has reached the preset voltage to the electronic circuit, a relatively large voltage can suddenly be applied to the electronic circuit. This reduces the oscillation starting time of a quartz crystal oscillating circuit of the electronic circuit.

The power supply may be a power generator. Preferably, when the power generator starts operating, the power supply control unit does not supply the power from the capacitor to the electronic circuit until the voltage of the capacitor reaches the preset voltage. Preferably, the power supply control unit supplies the power from the capacitor to the electronic circuit when the voltage of the capacitor becomes equal to or greater than the preset voltage.

Concerning the power supply, a commercial power supply or a car battery can be employed. Alternatively, various power generators can be employed, including a power generator for rotating a rotor and generating power by means of electromagnetic transduction, a piezoelectric generator for applying stress to a piezoelectric device and generating power, a solar battery, and a thermo-electric generator. These power generators may stop operating in accordance with operating conditions. When the present invention is applied to each of these power generators, the starting time to start up a system in which the power generator is activated is shortened. Hence, the present invention is advantageous.

Preferably, the power supply control unit includes a comparing circuit for comparing the voltage of the capacitor and the preset voltage, and an operation control unit for controlling activation and deactivation of the comparing circuit.

With this construction, the comparing circuit can be stopped by the operation control unit after the voltage of the capacitor reaches the preset voltage and the supply of power starts. The comparing circuit can be operated only when it is necessary to perform comparison of the voltage of the capacitor. Hence, it is possible to reduce power consumed by the power supply control unit, and energy conservation is performed for the electronic apparatus.

Preferably, the electronic circuit includes a constant voltage circuit driven by the voltage of the capacitor via the power supply control unit, an oscillation circuit driven by an output of the constant voltage circuit, and an oscillation detecting circuit for detecting whether the oscillation circuit is oscillating and for outputting an oscillation detection signal. The operation control unit may control activation and deactivation of the comparing circuit in response to the oscillation detection signal of the oscillation detecting circuit.

It is preferable that the operation control unit deactivate the comparing circuit when the oscillation circuit is oscillating, and activate the comparing circuit when the oscillation stops.

For example, when the power generator is activated by a spring, the generated voltage is gradually reduced as the spring is released. Activation and deactivation of the comparing circuit can be controlled in response to the oscillation detection signal of the oscillation detecting circuit. Hence, the comparing circuit is first activated when the oscillation of the oscillation circuit is stopped, and the comparing circuit is stopped when the oscillation circuit is in operation. Accordingly, the supply of power to the electronic circuit can be continued until the oscillation circuit is stopped, and the operating time of, the electronic circuit, such as the oscillation circuit or the IC, can be prolonged.

The operation control unit is not limited to one that activates/deactivates the comparing circuit in response to the output signal of the oscillation detecting circuit. For example, the operation control unit may activate/deactivate the comparing circuit in response to a signal from a timer or the like that outputs a predetermined signal at a constant interval.

When the power is not supplied from the capacitor to the electronic circuit, and when the voltage of the capacitor is increased to be a first preset voltage or greater, the power supply control unit may supply the power from the capacitor to the electronic circuit. When the power is supplied from the capacitor to the electronic circuit, and when the voltage of the capacitor is reduced below a second preset voltage which is set to be not greater than the first preset voltage, the power supply control unit may stop supplying the power from the capacitor to the electronic circuit.

In such cases, when the power is not supplied from the capacitor to the electronic circuit upon activation of the system or the like, and when the voltage of the capacitor becomes equal to or greater than the first preset voltage, the power is supplied to the electronic circuit. In contrast, when the power is supplied from the capacitor to the electronic circuit upon deactivation of the system or, the like, and when the voltage of the capacitor is reduced to the second preset voltage or less, the supply of power to the electronic circuit is stopped. By appropriately setting the second preset voltage, the time until the power is started to be supplied to the electronic circuit is prolonged, thus increasing the operating time of the electronic circuit, such as the oscillation circuit or the IC. Since the second preset voltage, that is, the value for stopping the system, can freely be set, the electronic circuit can be operated as long as the voltage for stably operating the IC or the like is ensured. By setting the deactivation voltage in accordance with characteristics of the electronic circuit, such as the IC, the electronic circuit can be operated in a stable manner.

The electronic circuit may include an oscillation circuit. The power supply control unit may supply the power from the capacitor to the electronic circuit when the voltage of the capacitor is increased to a first preset voltage or greater, and may stop supplying the power from the capacitor to the electronic circuit when the voltage is reduced and the oscillation circuit is thereby stopped.

In such cases, the power can be supplied to the electronic circuit until the oscillation circuit stops. When the oscillation circuit stops, the supply of power from the capacitor to the electronic circuit is stopped. Therefore, the power is not supplied wastefully, and, the voltage reduction in the capacitor is reduced. The capacitor can rapidly be boosted when the power is subsequently generated, and the oscillation circuit rapidly starts oscillating.

An electronically-controlled timepiece of the present invention includes an electronic apparatus as described hereinabove, and a time indicator in which speed is regulated by the electronic circuit of the electronic apparatus.

According to the electronically-controlled timepiece, the time until activation of the electronic apparatus is shortened, and the speed of the time indicator can rapidly be regulated. When the timepiece returns from performing hands adjustment, the timepiece can rapidly return to a normal control state. An error in the designated time upon returning from the hands adjustment is minimized.

Concerning the electronically-controlled timepiece, an electronically-controlled mechanical timepiece can be employed. In such a case, the power generator is driven by a mechanical energy source engaged therewith via mechanical energy transfer means. The time indicator is connected to the mechanical energy transfer means, and the electronic circuit controls the power generator, thus regulating the speed of the time indicator.

In the electronically-controlled mechanical timepiece, the capacitor has a low capacitance. When the power generator is stopped for three to five minutes or more in order to adjust the hands, the capacitor is discharged, and the electronic circuit is thereby stopped. When the present invention is applied to the electronically-controlled mechanical timepiece, the capacitor can rapidly be charged even when the capacitor is discharged by adjusting the hands. An error in the designated time upon returning from the hands adjustment is minimized.

A power supply control method of the present invention is performed for an electronic apparatus including a power supply, a capacitor for accumulating power from the power supply, and an electronic circuit driven by the power from the power supply. According to the power supply control method, the power is not supplied from the capacitor to the electronic circuit until a voltage of the capacitor reaches a preset voltage. The power is supplied from the capacitor to the electronic circuit when the voltage of the capacitor becomes equal to or greater than the preset voltage.

Preferably, the power supply is a power generator. When the power generator starts operating, the power may not be supplied from the capacitor to the electronic circuit until the voltage of the capacitor reaches the preset voltage. When the voltage of the capacitor becomes equal to or greater than the preset voltage, the power may be supplied from the capacitor to the electronic circuit.

According to the present invention, most of the power (for example, power generated by the power generator upon activation) supplied from the power supply can be supplied to the capacitor. The time until the voltage of the capacitor is boosted so as to reliably operate the electronic circuit, such as the IC, is shortened. Hence, the time until activation of the electronic circuit, such as the IC or the oscillation circuit, is shortened.

When the voltage of the capacitor is reduced below a second preset voltage, it is preferable to stop the supply of the power from the capacitor to the electronic circuit.

The electronic circuit may include an oscillation circuit. When the voltage of the capacitor is reduced and the oscillation circuit is thereby stopped, the supply of the power from the capacitor to the electronic circuit may be stopped By adopting this supply method, it is possible to prolong the time until the power is started to be supplied to the electronic circuit. Hence, the operating time of the electronic circuit, such as-the oscillation circuit or the IC, is increased.

BEST MODE FOR CARRYING OUT THE INVENTION

Embodiments of the present invention are described with reference to the drawings.

Figure 1:
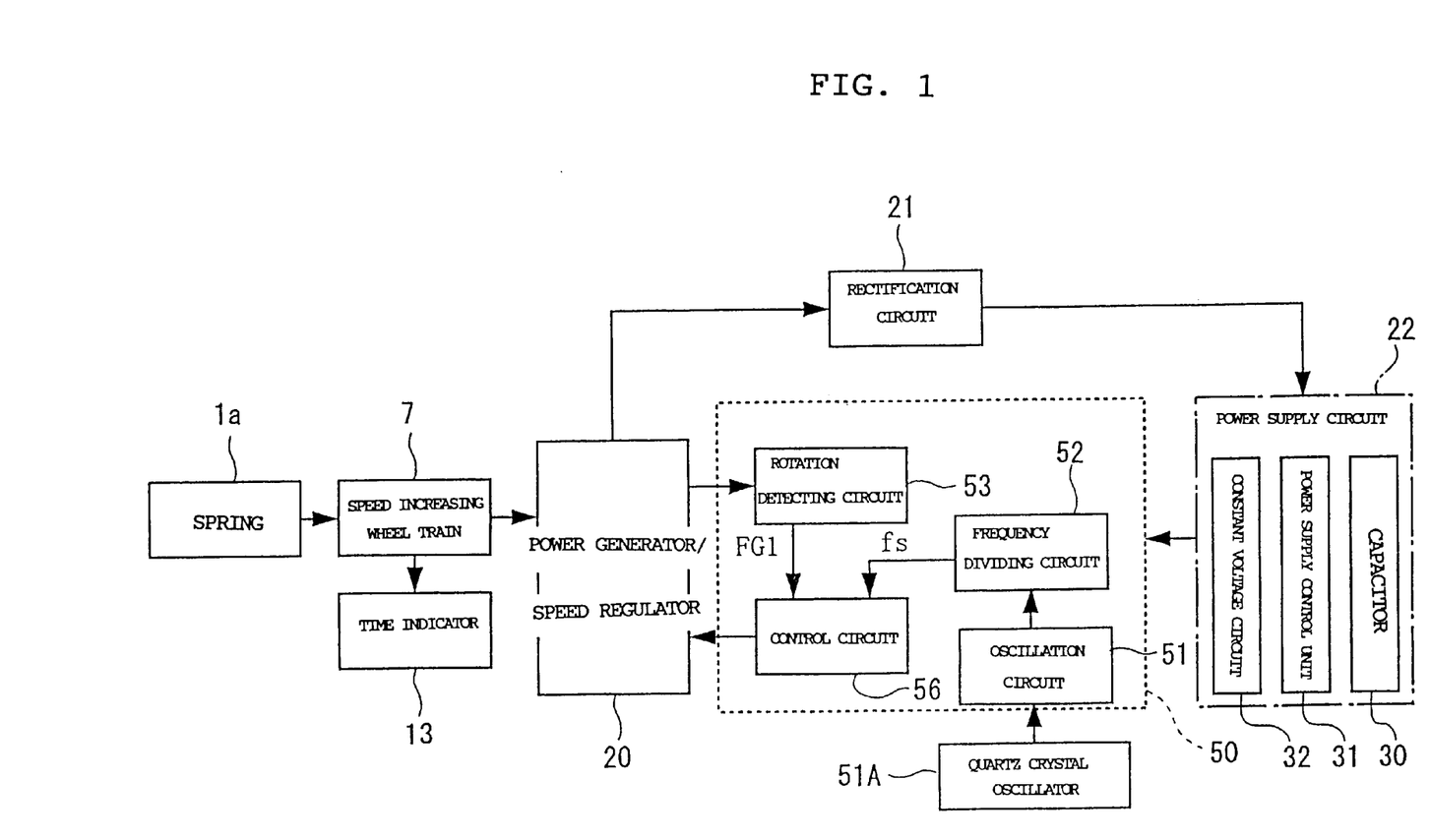
FIG. 1 is a block diagram of basic portions of an electronically-controlled timepiece according to an embodiment of the present invention.

In FIG. 1, a block diagram of an electronically-controlled mechanical timepiece according to an embodiment of the present invention is shown.

The electronically-controlled mechanical timepiece includes a spring 1a as a mechanical energy source, a speed increasing wheel train 7 as mechanical energy transfer means for transferring a torque of the spring 1a to a power generator 20 as a power supply, and hands 13 engaged with the speed increasing wheel train 7, which form a time indicator for indicating the time.

The power generator 20 is driven by the spring 1a through the speed increasing wheel train 7. The power generator 20 generates induced power and supplies electrical energy. AC output power from the power generator 20 is rectified through a rectification circuit 21 including at least one of a voltage-rise rectifier, a full-wave rectifier, a half-wave rectifier, and a transistor rectifier. The rectified power is boosted as circumstances demand, and a power supply circuit 22 formed by a capacitor or the like is charged and supplied with the power.

The speed of the power generator 20 is regulated by a rotation control unit 50. By regulating the speed of the power generator 20, the speed of the hands 13 engaged with the power generator 20 through the speed increasing wheel train 7 is also regulated. In other words, the power generator 20 serves both as a power generator and a speed regulator.

Figure 2:
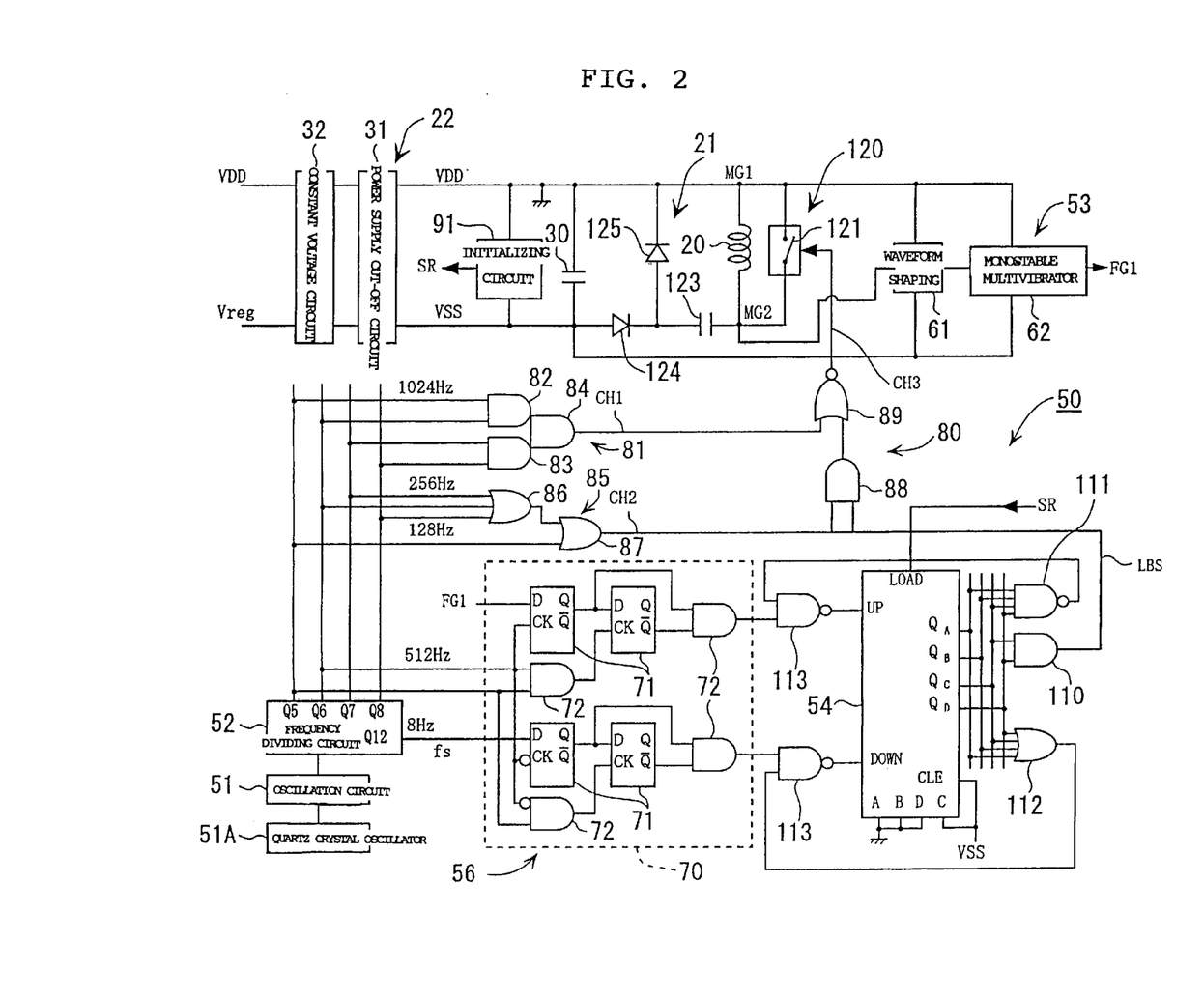
FIG. 2 is a circuit diagram of the structure of a control circuit of the embodiment.

More specifically, in this embodiment, as shown in FIG. 2, the power generator 20 is provided with a brake circuit 120. The brake circuit 120 is formed by a switch 121. The switch 121 closes a loop by short-circuiting a first AC output terminal MG1 for outputting an AC signal (AC current) generated by the power generator 20 and a second AC output terminal MG2, and applies a short brake. The brake circuit 120 is built in the power generator 20 which serves both as the power generator and the speed regulator. The switch 121 is formed by an analog switch or a semiconductor switch (bilateral switch) which is interrupted by a chopping signal (chopping pulse) CH3.

A booster rectification circuit 21 (rectification circuit in FIG. 1) is formed by a booster capacitor 123, diodes 124 and 125, and the switch 121 connected to the power generator 20. Regarding the diodes 124 and 125, any type of device can be employed as long as a device is a unidirectional device for allowing a current to pass in one direction. In particular, concerning the electronically-controlled mechanical timepiece, an electromotive force of the power generator 20 is small. Therefore, it is preferable to employ a Schottky barrier diode having a small voltage drop Vf as the diode 125. Concerning the diode 124, it is preferable to employ a silicon diode having a small reverse leakage current.

A capacitor 30 in the power supply circuit 22 is charged with a DC signal rectified by the rectification circuit 21. The brake circuit 120 is controlled by the rotation control unit 50 driven by power supplied from the power supply circuit 22.

As shown in FIG. 1, the rotation control unit 50 includes an oscillation circuit 51, a rotation detecting circuit 53, and a control circuit 56, which are electronic circuits.

The oscillation circuit 51 outputs an oscillation signal (32768 Hz) using a quartz crystal oscillator 51A which is a standard time source, and the oscillation signal is divided to a certain period by a frequency dividing circuit 52 formed by a 12-stage flip-flop. A twelfth output Q12 of the frequency dividing circuit 52 is output as a reference signal fs of 8 Hz.

The rotation detecting circuit 53 is formed by a waveform shaping circuit 61 and a monostable multivibrator 62, which are connected to the power generator 20. The waveform shaping circuit 61 is formed by an amplifier and a comparator, and converts a sine wave into a rectangular wave. The monostable multivibrator 62 functions as a band-pass filter for passing a pulse not greater than a certain period. The monostable multivibrator 62 outputs a rotation detection signal FG1 in which noise is removed.

The control circuit 56 includes an up-down counter 54 as brake control means, a synchronizing circuit 70, and a chopping signal generator 80.

Concerning an up-count input and a down-count input to the up-down counter 54, the rotation detection signal FG1 of the rotation detecting circuit 53 and the reference signal fs of the frequency dividing circuit 52, respectively, are input to the synchronizing circuit 70.

The synchronizing circuit 70 is formed by four flip-flops 71 and AND gates 72. The synchronizing circuit 70 employs signals from a fifth output (1024 Hz) and a sixth output (512 Hz) of the frequency dividing circuit 52 to synchronize the rotation detection signal FG1 with the reference signal fs (8 Hz), and adjusts these signals so that these signal pulses are not overlapped and output.

The up-down counter 54 is formed by a four-bit counter. Regarding the up-count input to the up-down counter 54, a signal based on the rotation detecting circuit FG1 is input from the synchronizing circuit 70. Regarding the down-count input to the up-down counter 54, a signal based on the reference signal fs is input from the synchronizing circuit 70. Accordingly, counting of the reference signal fs and the rotation detection signal FG1 and computation of the difference between the reference signal fs and the rotation detection signal FG1 are simultaneously performed.

The up-down counter 54 is provided with four data input terminals (preset terminals) A to D. H-level signals are input to the terminals A, B, and D, thus setting the initial value (preset value) of the up-down counter 54 to a counter value "11".

An initializing circuit 91 is connected to a lOAD input terminal of the up-down counter 54. The initializing circuit 91 outputs a system reset signal SR when the initializing circuit 91 is connected to the capacitor 30 in the power supply circuit 22 and power is first supplied to the capacitor 30. In this embodiment, the initializing circuit 91 is constructed to output an H-level signal until a charging voltage of the capacitor 30 reaches a predetermined voltage, and to output an L-level signal when the charging voltage becomes equal to or greater than the predetermined voltage.

The up-down counter 54 does not accept up-down inputs until the load input, i.e., the system reset signal SR, reaches the L-level. Hence, the counter value of the up-down counter 54 is maintained at "11".

The up-down counter 54 includes four-bit outputs QA to QD. When the counter value is "12" or more, the third and fourth bit outputs QC and QD output H level signals. When the counter value is "11" or less, at least one of the third and fourth bit outputs QC and QD outputs an L-level signal.

Therefore, an output LBS of an AND gate 110 to which the outputs QC and QD are input is an H-level signal when the counter value of the up-down counter 54 is "12" or more. When the counter value is "11" or less, the output LBS is an L-level signal. The output LBS is connected to the chopping signal generator 80.

Each output of a NAND gate 111 and an OR gate 112 to which the outputs QA to QD are input is input to a NAND gate 113 to which an output of the synchronizing circuit 70 is input. When a series of up-count signals is input, thus causing the counter value to be "15", an L-level signal is output from the NAND gate 111. When another up-count signal is input to the NAND gate 113, this input is canceled, so that no more up-count signals are input to the up-down counter 54. Similarly, when the counter value becomes "0", an L-level signal is output from the OR gate 112, thus canceling the input of the down-count signal. Accordingly, the counter value is set so that it will not become "0" after exceeding "15" or to become "15" after exceeding "0".

The chopping signal generator 80 is formed by first chopping signal generating means 81, second chopping signal generating means 85, an AND gate 88, and a NOR gate 89. The first chopping signal generating means 81 is formed by three AND gates 82 to 84, and outputs a first chopping signal CH1 by employing outputs Q5 to Q8 of the frequency dividing circuit 52. The second chopping signal generating means 85 is formed by two OR gates 86 and 87, and outputs a second chopping signal CH2 by employing the outputs Q5 to Q8 of the frequency dividing circuit 52. To the AND gate 88, the output LBS from the up-down counter 54 and the output CH2 from the second chopping signal generating means 85 are input. To the NOR gate 89, the output from the AND gate 88 and the output CH1 from the first chopping signal generating means 81 are input. The output CH3 from the NOR gate 89 in the chopping signal generator 80 is input to a gate of the switch 121 formed by a Pch transistor or the like. When an L-level signal is output from the output CH3, the switch 121 is maintained in an on state. The power generator 20 is thus shorted, and the brake is applied in the power generator 20.

In contrast, when an H-level signal is output from the output CH3, the switch 121 is maintained in an off state, and the brake is not applied in the power generator 20. Therefore, the power generator 20 is chopping-controlled by the chopping signal from the output CH3. The rotation control unit 50 for interrupting the switch 121 includes the chopping signal generator 80 for outputting the chopping signal.

When an L-level signal is output from the output LBS of the up-down counter 54 (when the count value is not greater than "11"), an L-level signal is also output from the AND gate 88. The output CH3 from the NOR gate 89 is a chopping signal that is an inverted output CH1. In other words, the chopping signal has a small duty ratio (a ratio of the on-state of the switch 121) in which the H-level signal (brake-off time) is long and the L-level signal (brake-on time) is short. Therefore, the brake-on time in a reference period is shortened, and almost no brake is applied in the power generator 20. Hence, weak-brake control is performed in which priority is given to power generation.

In contrast, when an H-level signal is output from the output LBS of the up-down counter 54 (when the counter value is not less than "12"), an H-level signal is output from the AND gate 88. The output CH3 from the NOR gate 89 is a chopping signal that is an inverted output CH2. In other words, the chopping signal has a large duty ratio in which the L-level signal (brake-on time) is long and the H-level signal (brake-off time) is short. Therefore, the brake-on time in the reference period is prolonged, and a strong brake is applied in the power generator 20. Since the brake is turned off in a predetermined period, chopping control is performed. The braking torque is improved while suppressing reduction in generated power. As described above, the output from the up-down counter 54 is used to change the duty ratio of the chopping signal or the like, thus switching between strong-brake control and weak-brake control. Hence, the speed of the power generator 20 is regulated.

Figure 3:
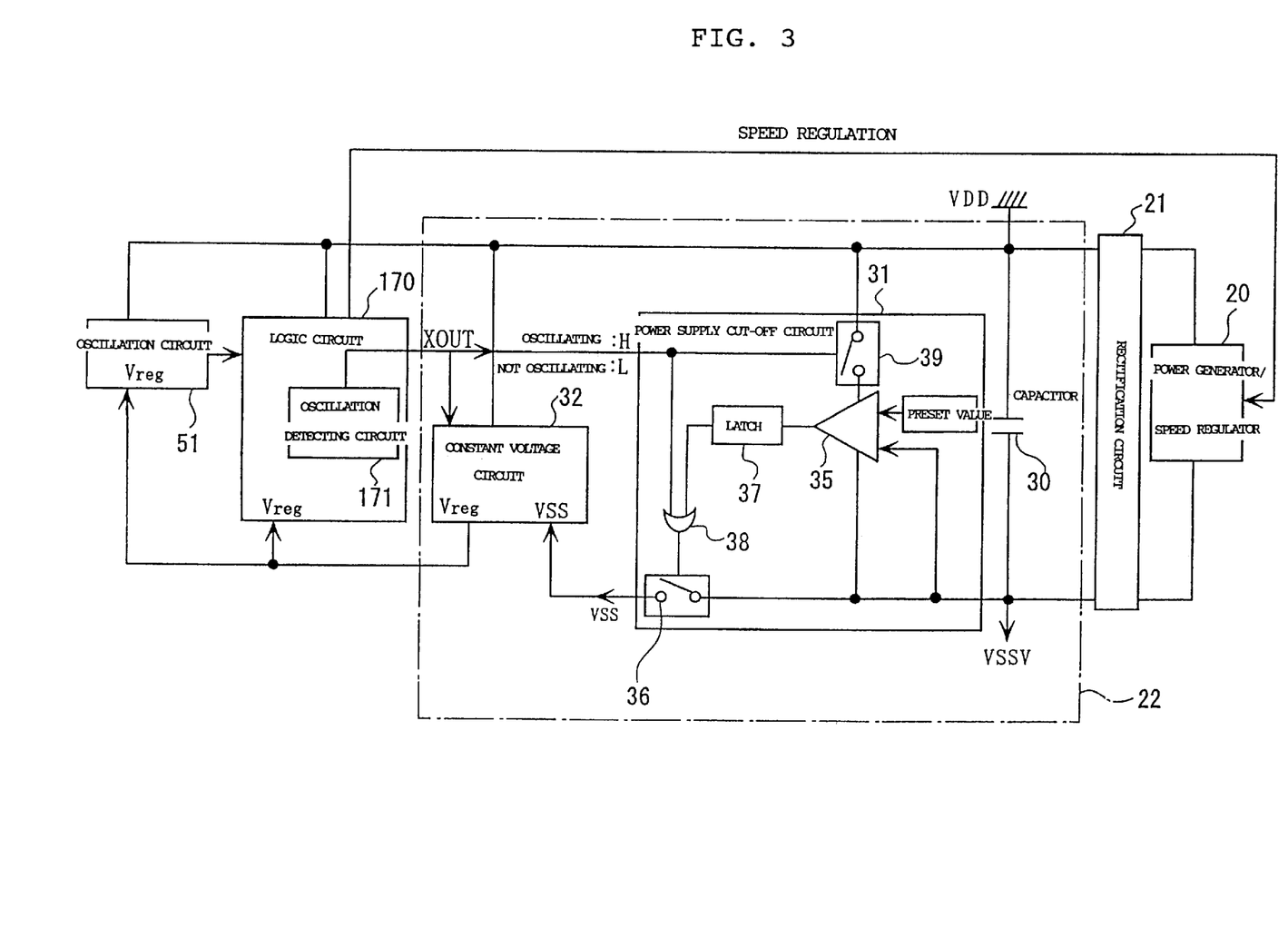
FIG. 3 is a circuit diagram of basic portions of the embodiment.

As shown in FIG. 3, the power supply circuit 22 includes the capacitor 30, a power supply cut-off circuit 31 as a power supply control unit, and a constant voltage circuit 32.

The capacitor 30 has a capacitance of approximately a few $\mu F$ to a few tens of $\mu F$, such as 10 $\mu F$. Power generated by the power generator 20 is stored in the capacitor 30 via the rectification circuit 21. Hence, the capacitor 30 forms a charger.

The power supply cut-off circuit 31 includes a comparator 35 as a comparing circuit and a switch 36 as an operation control unit. The comparator 35 compares an output voltage VSSV of the capacitor 30 and a preset value (preset voltage Vcutoff, for example 0.65 V). When the output voltage VSSV is less than the preset value (non-detection), the comparator outputs an L-level signal. When the output voltage VSSV exceeds the preset value (detection), the comparator outputs an H-level signal.

The signal from the comparator 35 is maintained by a latch circuit 37, and is input to an OR circuit 38. An oscillation detection signal output from an oscillation detecting circuit 171 (described hereinafter) is input to the OR circuit 38. The switch 36 is operated in accordance with an output from the OR circuit 38.

The constant voltage circuit 32 is driven by a power supply VSS, and outputs a voltage Vreg (for example 0.5 V) which is less than the power supply VSS and is at a constant level. The constant voltage circuit 32 serves as a driving power supply for all circuits (electronic circuits including the oscillation circuit 51 and a logic circuit 170) except for the rectification circuit 21 and the power supply cut-off circuit 31.

The logic circuit (IC: integrated circuit) 170 includes the frequency dividing circuit 52, the control circuit 56, and the like. The logic circuit 170 mainly obtains information, such as a rotational state, of a rotor of the power generator 20, and regulates the speed of the power generator 20 so that the rotor rotates at a constant speed.

The logic circuit 170 is provided with the oscillation detecting circuit 171 for detecting an oscillating state of the oscillation circuit 51. When the oscillation circuit 51 is oscillating, the oscillation detecting circuit 171 outputs an H-level signal as an oscillation detection signal XOUT to the power supply cut-off circuit 31 and to the constant voltage circuit 32. When the oscillation circuit 51 is not oscillating, the oscillation detecting circuit 171 outputs an L-level signal to the power supply cut-off circuit 31 and to the constant voltage circuit 32.

Regarding the oscillation detecting circuit 171, any type of circuit can be used as long as the above operation is performed. For example, a circuit shown in FIG. 4 can be used. Specifically, the oscillation detecting circuit 171 of the embodiment includes two switches 172 and 173 interrupted by an oscillation signal IN (pulse signal output from the frequency dividing circuit 52) from the oscillation circuit 51, two capacitors 174 and 175, a resistor 176, and two inverters 177 and 178.

Figure 4:
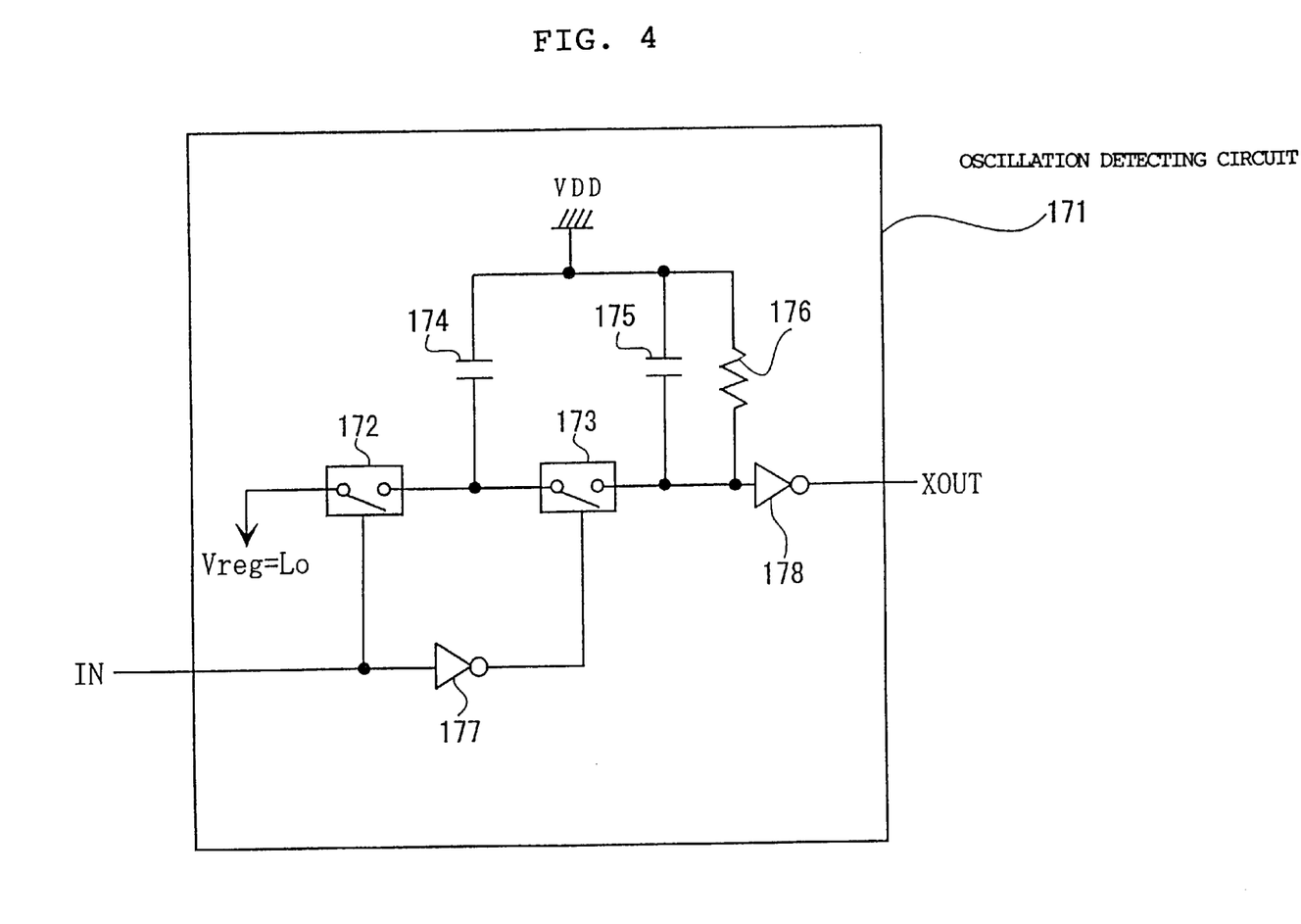
FIG. 4 is a circuit diagram of the structure of an oscillation detecting circuit shown in FIG. 3.

The switches 172 and 173 are interrupted by the oscillation signal IN. Since the signal to one switch 173 is inverted by the inverter 177, the switches 172 and 173 are alternately interrupted when the oscillation circuit 51 is oscillating and when the signal IN is a pulse signal. Accordingly, the capacitors 174 and 175 are gradually charged, and terminal portions facing the switch 173 approach the Vreg voltage (L-level). While the oscillating circuit 51 is oscillating, the provision of the inverter 178 causes the output signal XOUT of the oscillation detecting circuit 171 to be an H-level signal.

In contrast, when the oscillation circuit 51 is stopped, and when the signal IN is in an L-level state, one of the switches 172 and 173 remains connected, while the other remains disconnected. Therefore, the capacitors 174 and 175 are not charged. Charges in the capacitors 174 and 175 are discharged via the resistor 176, and terminal portions of the capacitors 174 and 175 facing the switch 173 approach a VDD voltage (H-level). While the oscillation circuit 51 is not oscillating, the provision of the inverter 178 causes the output signal XOUT of the oscillation detecting circuit 171 to be an L-level signal.

The switch 36 employed in this embodiment is a switch (for example, an Nch transistor) which is connected (closed) when an H-level signal is input from the OR circuit 38, and which is disconnected (opened) when an L-level signal is input. The L-level signal is output from the OR circuit 38 when the oscillation detection signal from the oscillation detecting circuit 171 is an L-level signal (oscillation is stopped), and when a signal from the latch circuit 37, that is, the comparator 35, is an L-level signal (when the output voltage VSSV of the capacitor 30 is less than the preset voltage). In such a case, the switch 36 is turned off, thus stopping power supply to the constant voltage circuit 32.

The voltage of the power supply VSS becomes 0 V.

In contrast, when an H-level signal is output from the oscillation detecting-circuit 171 (when the oscillation circuit 51 is oscillating), or when a signal from the latch circuit 37, that is, the comparator 35, is an H-level signal (when the output voltage VSSV of the capacitor 30 is equal; to or greater than the preset voltage), the switch 36 is turned on. The output VSSV of the capacitor 30 is output as the power supply VSS to the constant voltage circuit 32.

The oscillation detecting circuit XOUT of the oscillation-detecting circuit 171 and the signal from the comparator 35 are employed to turn on the switch 36 in the power supply cut-off circuit 31, thus regulating the output voltage from the power-supply cut-off circuit 31 to be 0 V or VSSV.

A switch 39 is connected to the comparator 35 to control driving of the comparator 35. When the oscillation detection signal XOUT of the oscillation detecting circuit; 171 is an H-level signal (oscillating), the switch 39 is turned off (opened), thus stopping the comparator 35. When the oscillation detection signal XOUT is an L-level signal (not oscillating), the switch 39 is turned on (closed), thus driving the comparator 35. In practice, the switch 39 is formed by a Pch transistor for performing the above operation. Therefore, the comparator 35 is operated only when-the oscillation detecting circuit 171 is not oscillating. When the comparator 35 is stopped, the signal output before the comparator 35 is stopped is maintained by the latch circuit 37.

Concerning the oscillation detecting circuit, a circuit may be used for outputting an L-level signal when the oscillation circuit 51 is oscillating and for outputting an H-level signal when the oscillation circuit 51 is not oscillating. In this case, the switches-36 and 39 are set so that the above operation is performed in accordance with these signals.

Figure 5:
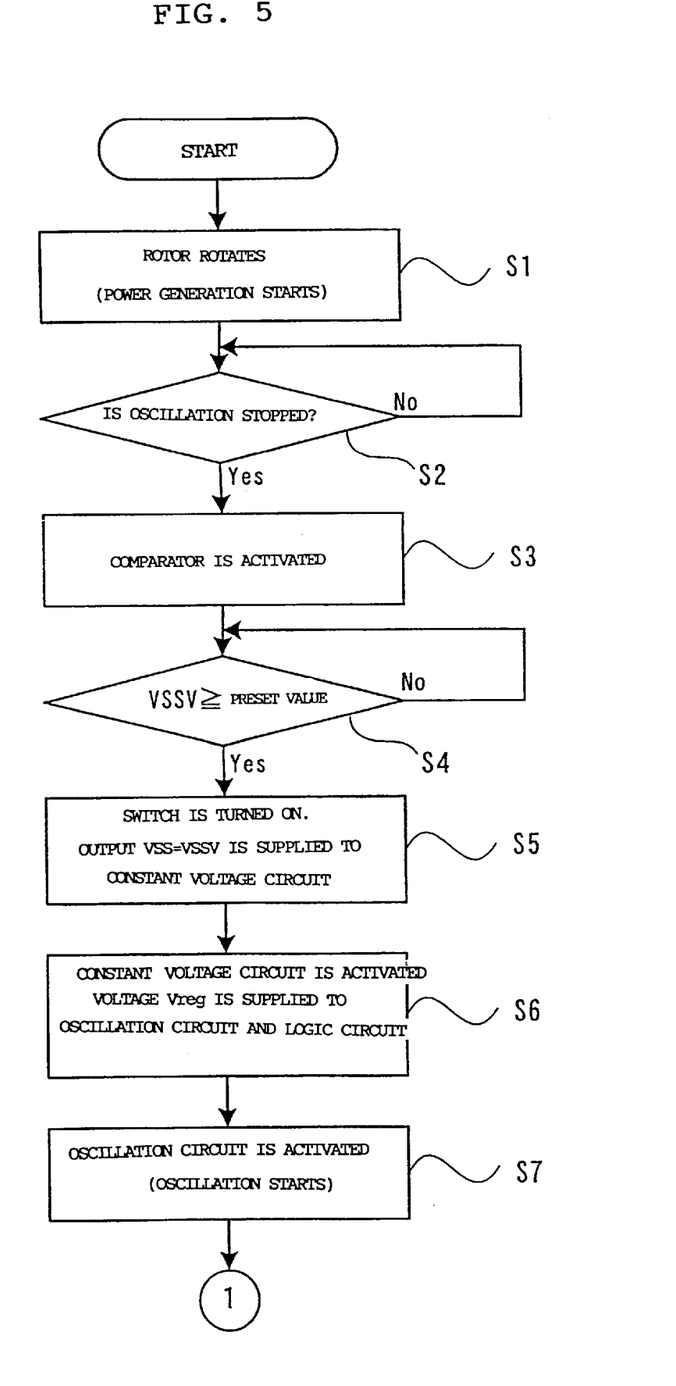
FIG. 5 is a flowchart showing a power supply control method of the embodiment.
Figure 6:
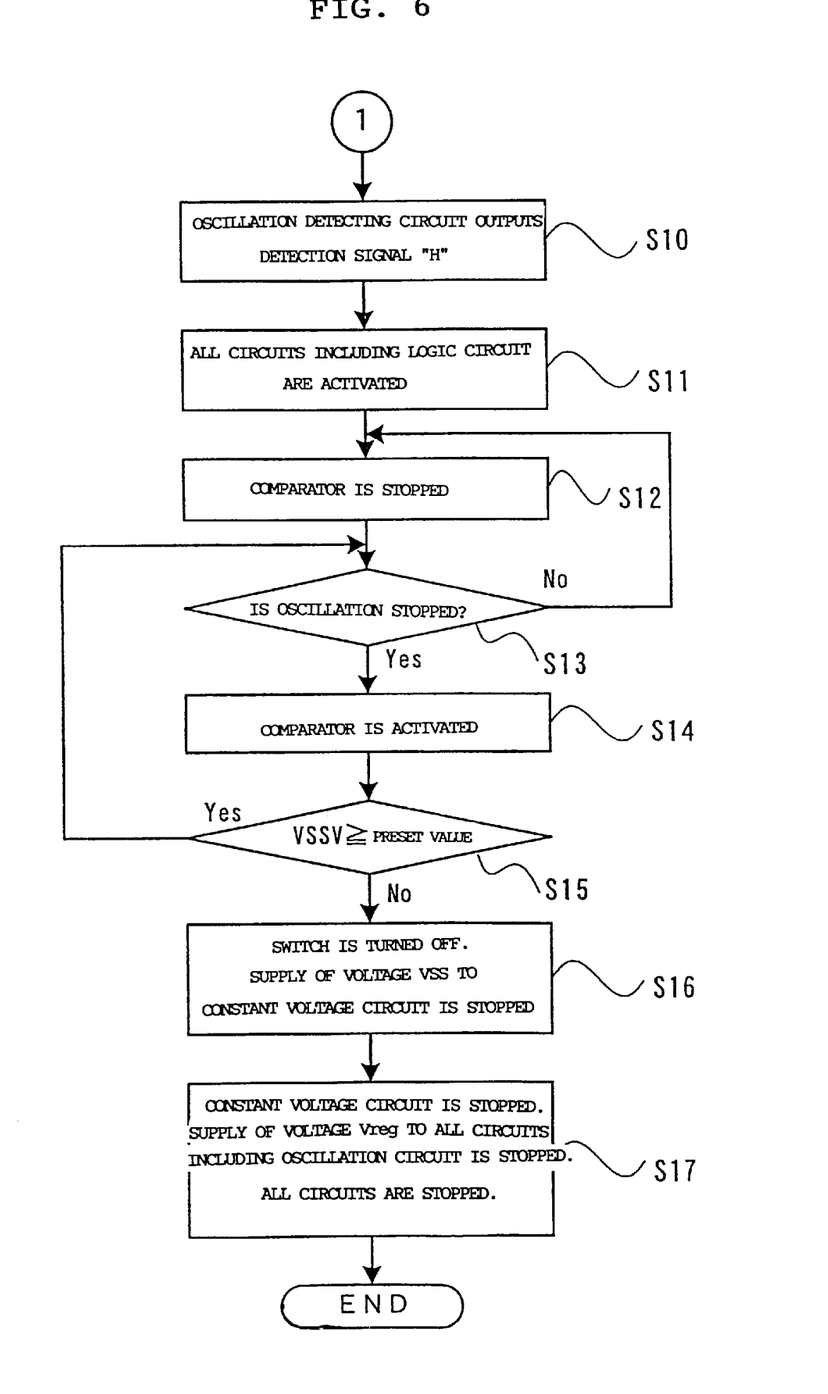
FIG. 6 is a flowchart showing a process subsequent to the flowchart shown in FIG. 4.

The operation of the embodiment is described with reference to flowcharts shown in FIGS. 5 and 6 and to a graph shown in FIG. 7.

When the hands adjustment is performed or the spring 1a is released, the power generator 20 is stopped, and the capacitor 30 is discharged to 0 V. When the spring 1a is wound or the hands adjustment is canceled, the rotor of the power generator 20 starts rotating, thus starting power generation (step 1, hereinafter step is referred to as "S"). When the capacitor 30 is being discharged, the oscillation circuit 51 is stopped. When power generation starts, the switch 36 remains in an off state.

Power generated by the power generator 20 is charged in the capacitor 30 via the rectification circuit 21. Since the oscillation circuit 51 is in a non-oscillating state (S2), the switch 31 is turned on, and the comparator 35 is activated (S3).

The comparator 35 compares the output VSSV of the capacitor 30 and the preset value, and determines whether the output VSSV of the capacitor 30 is equal to or greater than the-preset value (S4). When the output VSSV of the capacitor 30 is less than the preset value, an L-level signal is output from the comparator 35. Since the oscillation circuit 51 is not oscillating, the switch 36 remains in an off state. The comparator 35 continuously performs voltage comparison processing.

When the output VSSV of the capacitor 30 is less than the preset value (detected voltage value: Vcutoff) (S4), as shown by range A (the system is starting up) in FIG. 7, the voltage (power supply voltage) of the capacitor 30 gradually increases as the capacitor 30 is being charged by the power generator Since the switch 36 is turned off, power from the capacitor 30 is not supplied to the constant voltage circuit 32 and the like. Hence, power consumption is reduced, and the charging voltage of the capacitor 30 rapidly increases.

Figure 7:
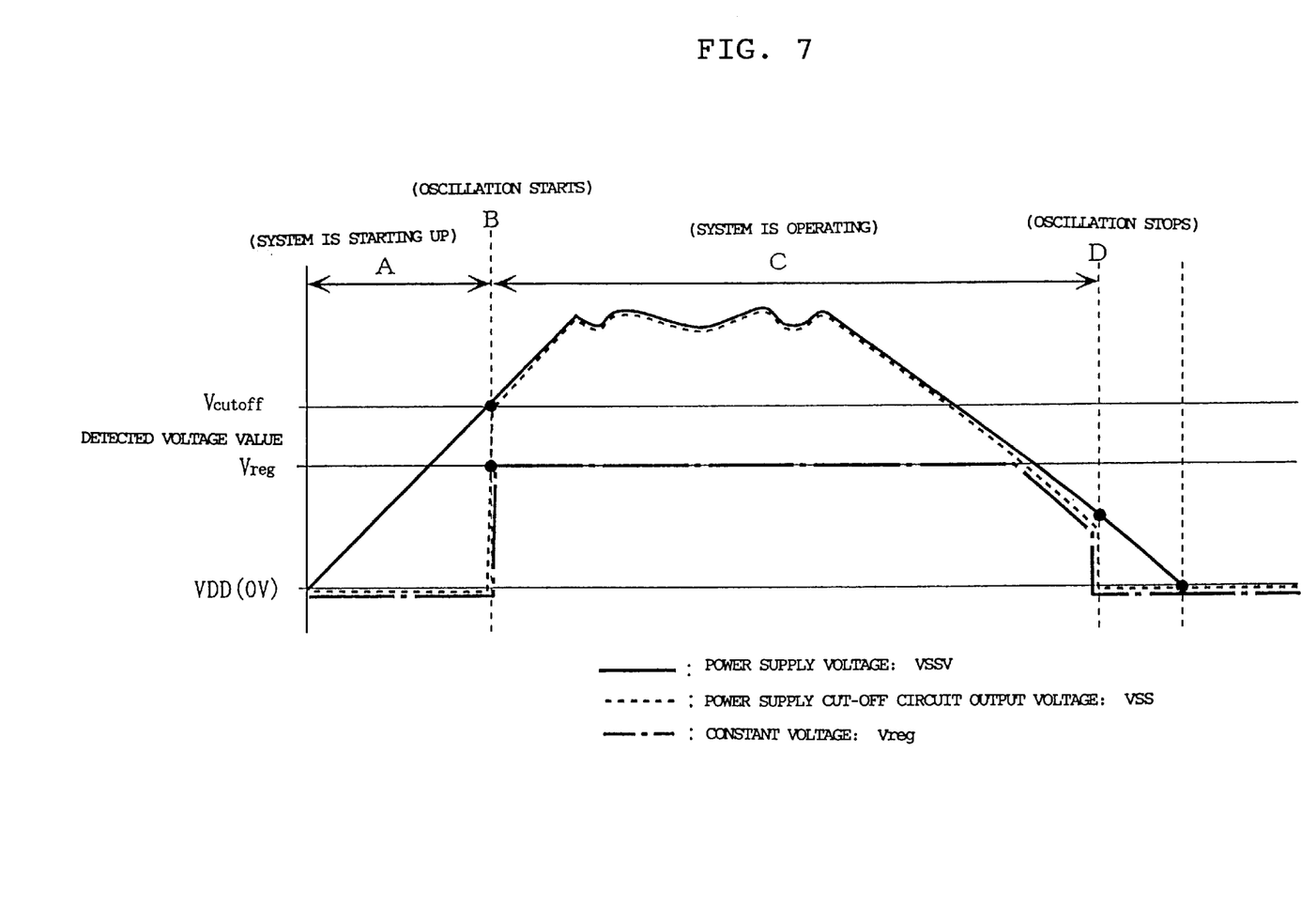
FIG. 7 is a graph showing an output voltage of each circuit of the embodiment.

When the output voltage VSSV of the capacitor 30 becomes equal to or greater than the preset value (S4), the comparator 35 outputs an H-level signal, and the switch 3 6 is turned on, as indicated by time B (oscillation starts) in FIG. 7. Accordingly, the output VSS of the power supply cut-off circuit 31 becomes the same as VSSV (S5).

The output VSS is employed to activate the constant voltage circuit 32, and a voltage vreg is supplied to all circuits including the oscillation circuit 51 and the logic circuit 170 (S6). The output Vreg from the constant voltage circuit 32 is employed to activate the oscillation circuit 51, and the oscillation starts (S7).

When the oscillation circuit 51 is oscillating, an H-level signal is output from the oscillation detecting circuit 171 (S10), and all circuits including the logic circuit 170 are activated (S11).

In response to the H-level signal from the oscillation detecting circuit 171, the switch 39 is turned off, and the comparator (comparing circuit) 35 is stopped (S12). During the system operating period in which the logic circuit 170 is operating, as indicated by range C (the system is operating) in FIG. 7, the voltage VSSV of the capacitor 30 and the output voltage VSS of the power supply cut-off circuit 31 have the same values, and the output Vreg of the constant voltage circuit 32 remains constant.

When the number of rotations of the power generator 20 is decreased by, for example, releasing the spring 1a, both the outputs VSSV and VSS are reduced. When these outputs are reduced below the voltage Vreg, the input VSS of the constant voltage circuit 32 is reduced, thus causing the output Vreg to have the same value as the outputs VSSV and VSS.

When the output Vreg of the constant voltage circuit 32 is reduced below a predetermined voltage, such as 0.4 V, as shown by point D (oscillation stops) in FIG. 7, the oscillation of the oscillation circuit 51 stops (S13), and the oscillation detecting circuit 171 outputs an L-level signal Subsequently, the switch 39 is turned on, and the comparator (comparing circuit) 35 is activated again (S14). The output VSSV of the capacitor 30 is compared and detected by the comparator 35 (S15).

Since the output voltage VSSV of the capacitor 30 is less than the preset value Vcutoff, the comparator 35 outputs an L-level signal. Also, the oscillation detection signal is an L-level signal. Thus, the switch 36 is turned off, and the voltage VSS supplied to the constant voltage circuit 32 becomes 0 V, that is, the supply is stopped (S16).

Accordingly, the constant voltage circuit 32 is stopped, and the supply of the voltage Vreg to the oscillation circuit 51 and to the logic circuit 170 is stopped. All circuits are stopped (S17). The operation of the overall system is stopped.

When the spring 1a is wound to start generating power, the above processing (S1 to S17) is repeated.

When the oscillation stops (S13), the output voltage VSSV of the capacitor 30 is normally less than the preset value Vcutoff. When the oscillation circuit 51 is temporarily stopped by a disturbance or the like, the output voltage VSSV of the capacitor 30 may be equal to or greater than the preset value Vcutoff. Therefore, when the output voltage VSSV of the capacitor 30 is equal to or greater than the preset value (S15), it is reconfirmed whether the oscillation is stopped (S13). When it is determined that the oscillation stop is only temporary, and that the oscillation is not stopped (S13), the switch 39 is turned off, and the comparator 35 is stopped (S12). Subsequently, the processing from S13 to S15 is repeated.

According to the above embodiment, the following advantages are achieved.

1) The power supply cut-off circuit 31 is provided, and, when the system is starting up, no voltage is fed to the constant voltage circuit 32 until the output voltage VSSV of the capacitor 30 is increased to be the preset value Vcutoff or greater. Therefore, almost all the power generated by the power generator 20 can be used to charge the capacitor 30, and a leakage current to the constant voltage circuit 32 or the like is not generated. Hence, it is possible to rapidly charge the capacitor 30 so as to activate the electronic circuits including the oscillation circuit 51 and the logic circuit 170.

It is possible to shorten the period of time required to activate the oscillation circuit 51. and the logic circuit 170. It impossible to rapidly perform the speed regulation of the power generator 20, that is, the movement regulation of the hands, using the logic circuit 170 or the like. When the power generator 20 returns from a state in which the power generator is stopped by the hands adjustment or the like, it is possible to minimize an error in the designated time, which is caused by a time delay until hands-movement control is performed.

Figure 8:
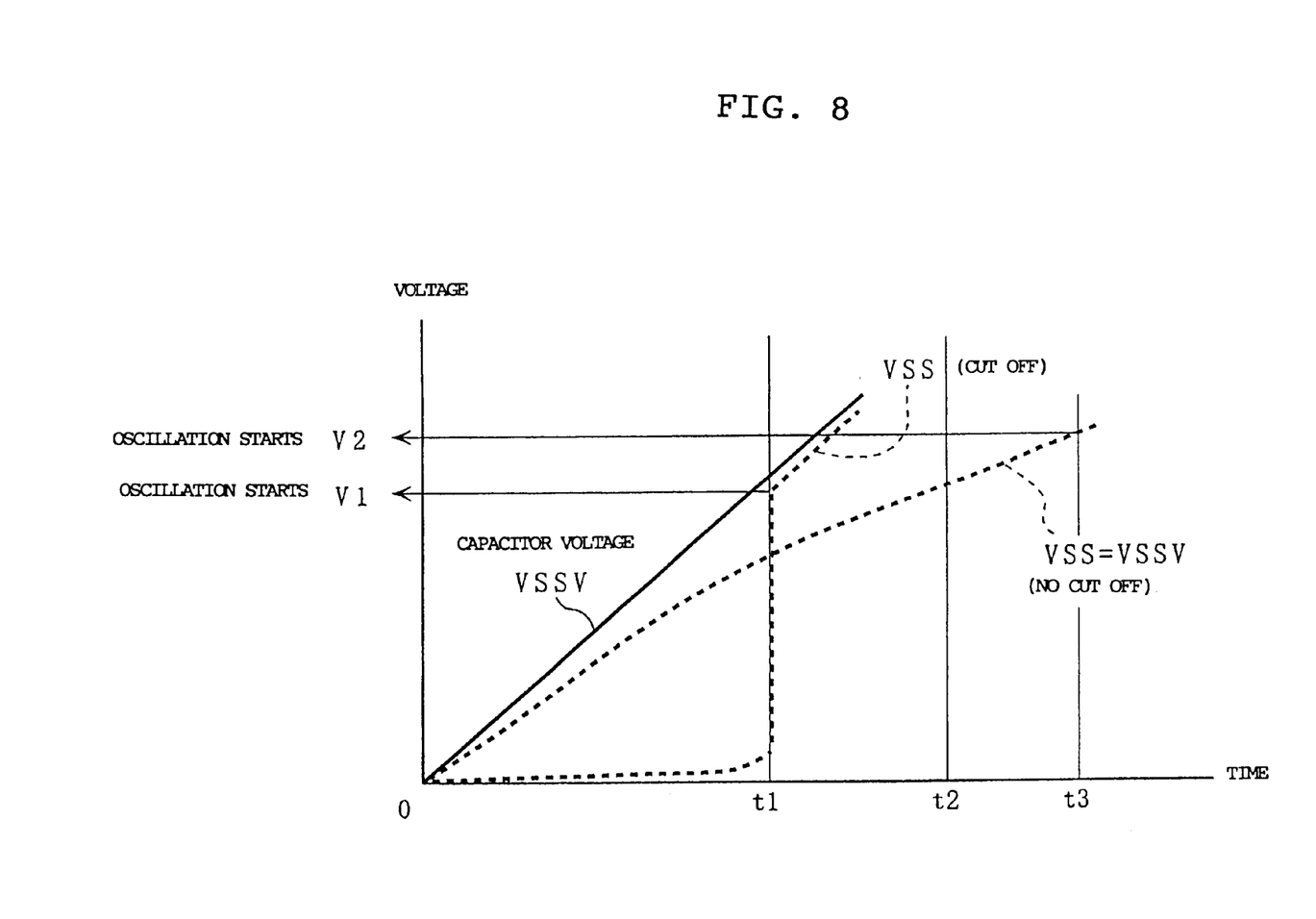
FIG. 8 is a graph describing an oscillation state when power generation is started in the embodiment.

2) When the voltage VSSV of the capacitor 30 is equal to or greater than the preset value Vcutoff, the voltage Vreg can suddenly be applied to the oscillation circuit 51. Therefore, the oscillation circuit 51 is made ready to oscillate, and the period of time required to start oscillating is shortened. Specifically, as shown in FIG. 8, when a voltage V1 is suddenly applied to the crystal oscillating circuit 51 (a state at time t1), the crystal oscillating circuit 51 starts oscillating. In contrast, when a voltage that gradually rises in accordance with rising of the voltage VSSV of the capacitor 30 is continuously applied to the crystal oscillating circuit 51, the crystal oscillating circuit 51 does not oscillate at time t2 in which the output VSS has the same value as the voltage V1. In this case, the crystal oscillating circuit 51 does not start oscillating until time t3 when a voltage V2 greater than the voltage V1 is applied thereto. Since the oscillation can be started at the lower voltage V1, the period of time required to start oscillating is reduced to time t1, compared to time t3 at which the oscillation is started at voltage V2.

3) The power supply cut-off circuit 31 is operated by the switch 39 which is activated in response to the oscillation detection signal from the oscillation detecting circuit 171. When the oscillation circuit 51 is oscillating, power is not supplied to the comparator 35, and the comparing circuit (comparator 35) is stopped. Hence, power consumption is reduced, and energy conservation is performed for the electronically-controlled mechanical timepiece.

4) The power supply cut-off circuit 31 is not activated until the oscillation stops. Even when the output voltage VSSV of the capacitor 30 falls below the preset value Vcutoff, the oscillation circuit 51 and the logic circuit 170 are continuously operated until the oscillation circuit 51 is naturally stopped by a reduction in the output Vreg. The operating time of the logic circuit 170, that is, the moving time of the hands, is prolonged.

The present invention is not limited to the above embodiment, and various modifications and improvements may be made in the present invention without departing from the scope of achieving the objects of the present invention.

For example, in the above embodiment, the switch 39 is provided at a side of the power supply VDD. Instead, the switch 39 can be provided at a side of the power supply VSS. Alternatively, each of the power supplies VSS and VDD may be provided with the switch 39. The type of the switch 39, such as a transistor, can be selected in an appropriate manner. In short, any switch 39 is sufficient as long as it is constructed to activate the comparing circuit (comparator 35) only when detection of voltage is necessary.

The switch 36 is not limited to one activated by the output of the oscillation detecting circuit 171. For example, the switch 36 may be constructed to be activated in accordance with the output voltage of the constant voltage circuit 32. In short, the switch 36 is required to be turned on while the logic circuit 170 and the oscillation circuit 51 are in operation. Alternatively, a timer may be provided for outputting a signal at a predetermined interval. In response to the signal from the timer, the switch 36 may be interrupted to activate/deactivate the comparing circuit (comparator 35).

Regarding the power supply cut-off circuit 31, the switch 39 may not be provided, and the comparator 35 may continuously be operated. In this case, when the voltage VSSV of the capacitor 30 is reduced to a predetermined preset value or less, the switch 36 can be turned off.

Figure 9:
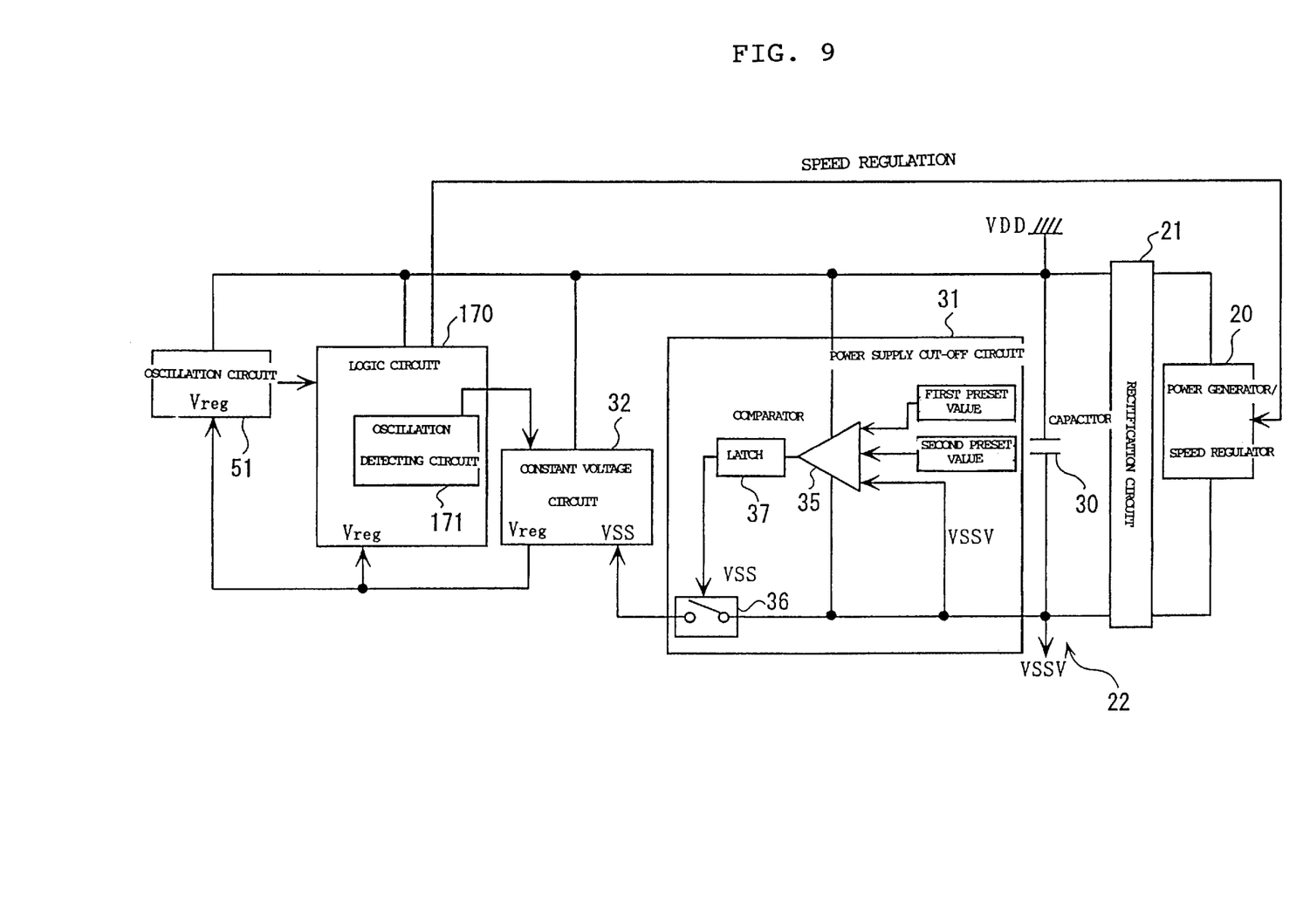
FIG. 9 is a circuit diagram of basic portions of a modification of the present invention.

The preset value for deactivation can be the same as the preset value Vcutoff when the system is started. As shown in FIG. 9, when the preset value is set at a second preset value (for example, 0.4 to 0.5 V) which is smaller than a first preset value Vcutoff (for example, 0.65 V), as in the above embodiment, the operating time of the oscillation circuit 51 and the logic circuit 170 is prolonged. In addition, when the second preset value is employed, a designer is permitted to freely set a voltage value to stop supplying power. For example, the output vreg of the constant voltage circuit 32 can be designed to be stopped before being: reduced below a predetermined value (for example, 0.5 V). Hence, power supply can be stopped at a relatively high voltage. In this case, a voltage value of power supplied to the logic circuit 170 or the like remains at a predetermined level or higher. Even when the temperature conditions and the like vary, the operation of the IC is always stable. Furthermore, when power supply is stopped at a relatively high voltage, the charging voltage of the capacitor 30 remains relatively high. The voltage of the capacitor 30 can be rapidly increased to the preset value or greater when the capacitor 30 is reactivated. Hence, it is possible to shorten the time before reactivation.

In the above embodiment, the oscillation detection signal from the oscillation detecting circuit 171 is employed to activate the comparator 35, and the comparator 35 compares the voltage of the capacitor 30 and the preset value, and controls power supply. Alternatively, when the oscillation circuit 51 is stopped, the voltage of the capacitor 30 may not be required to be compared with the preset value. The power supply cut-off circuit 31 is immediately activated, thus stopping power supply.

In the above embodiment, two types of chopping signals CH3 having different duty ratios are input to the switch 121 to control braking. Alternatively, for example, the inverted signal LBS may be input to the switch 121, and braking may be controlled without using the chopping signal. In the above embodiment, the loop formed by the terminals MG1 and MG2 is closed, thus applying short braking and performing braking control. Alternatively, a variable resistor or the like may be connected to the power generator 20. A current flowing through the coil of the power generator 20 may be changed, thereby performing braking control. In short, the specific structure of the control circuit 56 is not limited to that shown in FIG. 2, and may appropriately be modified in accordance with a braking method.

Concerning the mechanical energy source for driving the power generator 20, it is not limited to the spring 1a, and includes rubber, a spring, a weight, and a fluid, such as compressed air. The mechanical energy source may appropriately be selected in accordance with an apparatus to which the present invention is applied. Concerning input means for inputting mechanical energy to the mechanical energy source, there is manual winding, an oscillating weight, potential energy, a pressure change, wind power, hydraulic power, a temperature difference, or the like.

Concerning mechanical energy transfer means for transferring mechanical energy from the mechanical energy source, such as the spring, to the power generator, it is not limited to the wheel train 7 (gear), as in the above embodiment. The energy transfer means includes a friction wheel, a belt (timing belt or the like) and pulley, a chain and sprocket wheel, a rack and pinion, or a cam. The energy transfer means may appropriately be selected in accordance with a type of electronic apparatus, such as the electronically-controlled timepiece, to which the present invention is applied.

Concerning the time indicator, it is not limited to the hands 13. A circular disk, an annular indicator, or a circular-arc indicator can be employed. Alternatively, a digital time indicator using a liquid crystal panel or the like may be employed.

Concerning the power supply, it is not limited too the power generator 20 for rotating the rotor by the spring and generating power by means of electromagnetic transduction. Various power generators using an oscillating weight, a piezoelectric device, a solar battery, or a thermo-electric generator can be employed. Concerning the power supply, it is not limited to the power generator. Various power supplies, such as a commercial power supply and a car battery, can be employed.

More specifically, the electronically-controlled timepiece of the present invention is applicable to various electronically-controlled timepieces having a power supply, such as a power generator, e.g., an oscillating weight, a piezoelectric device, a solar battery, or a thermo-electric generator, or a power supply, e.g., a commercial power supply or a car battery, and a capacitor for storing power generated by the power generator or supplied from the power supply. When the present invention is applied to these timepieces, the starting time to start up the system in which the power supply is started to be activated is shortened. Hence, an error in accuracy in speed regulation is minimized.

Application of the present invention is not limited to a timepiece. The present invention is applicable to a bracket clock, a clock, a portable blood pressure manometer, a cellular phone, a pager, a pedometer, a calculator, a portable personal computer, an electronic notebook, a portable radio, a music box, a metronome, a flow meter, and a fluid discharging apparatus. Specifically, the present invention can be applied broadly to an electronic apparatus having a power supply, such as a power generator, a capacitor, and an electric circuit, such as an IC, for consuming electrical power in particular, the present invention is applicable to an electronic apparatus apart from the timepiece, such as a music box, a flow meter, or a fluid discharging apparatus, which is provided with a power generator or the like in which a generated voltage is not very high since the apparatus is rotated at a low speed.

Industrial Applicability

As described above, according to an electronic apparatus, an electronically-controlled timepiece, and a power supply control method of the present invention, electronic circuits, such as an IC and an oscillation circuit, can rapidly be activated when a power supply, such as a power generator, starts operating.

What is claimed is:

1. An electronic apparatus comprising:
   a power supply;
   a capacitor for accumulating charge from said power supply;
   an electronic circuit selectively driven by the accumulated charge from said capacitor;
   an oscillating circuit;
   an oscillation detecting circuit for determining when said oscillating circuit is in an oscillating state;
   a voltage-comparing circuit for determining when the voltage of said capacitor is not less than a first reference voltage;
   a switching circuit responsive to a control input for selectively coupling said capacitor to drive said electronic circuit, whereby said electronic circuit is placed in a power-active mode, and for selectively decoupling said capacitor from said electronic circuit, whereby said electronic circuit is placed in an inactive mode;
   a power-supply-control unit having a control output coupled to said control input of said switching circuit, said power-supply-control unit being effective for transitioning said electronic circuit from said inactive mode to said active mode in response to the detection result from one of said oscillation detecting circuit and voltage-comparing circuit, and effective for transitioning said electronic circuit from said active mode to said inactive mode in response to the detected result from the other one of said oscillation detecting circuit and voltage-comparing circuit.

2. An electronic apparatus according to claim 1, wherein the oscillation detecting circuit is inactive so as to conserve power when said power-supply-control unit is being responsive to said voltage-comparing circuit, and wherein said voltage comparing circuit is inactive so as to conserve power when said power-supply control unit is being responsive to said oscillation detecting circuit.

3. An electronic apparatus according to claim 1, wherein said voltage-comparing circuit includes an enable input coupled to said oscillation detecting circuit, said voltage-comparing circuit being disabled in response to said oscillation detecting circuit detecting that said oscillating circuit is in said oscillating state, and said voltage-comparing circuit being enabled in response to said oscillation detecting circuit detecting that said oscillating circuit is in a non-oscillating state.

4. An electronic apparatus according to claim 3, wherein said electronic circuit includes a constant voltage circuit for producing a regulated voltage from the charge transferred from said capacitor; and wherein
   said voltage-comparing circuit includes a comparator and a switch, said switch being effective for selectively transferring power to said comparator in response to said enable input.

5. An electronic apparatus according to claim 4, wherein said power-supply-control unit includes an OR gate having a first input node coupled to receive the detection result from said voltage-comparing circuit, and having a second input node coupled to receive the detection result from said oscillation detecting circuit, the output of said OR gate being coupled to said control output of said power-supply-control unit.

6. An electronic apparatus according to claim 1, wherein said power-supply-control unit causes said electronic circuit to transition from said inactive mode to said active mode in response to said voltage-comparing circuit determining that the voltage of said capacitor has transitioned from a point lower than said first reference voltage to a point not lower than said first reference voltage, irrespective of the detected result from said oscillation detecting circuit;
   said power-supply-control unit being further effective for maintaining said capacitor in said active mode irrespective of said voltage-comparing circuit until said oscillation detecting circuit detects that said oscillation circuit has transitioned from said oscillating state to a non-oscillating state.

7. An electronic apparatus according to claim 1, wherein said power-supply-control unit further supplies power from said capacitor to said oscillation circuit, and said oscillation circuit is in said oscillating state when the voltage of said capacitor is not less than a second reference voltage and is in a non-oscillating state when the voltage of said capacitor is less then said second reference voltage;
   said first reference voltage being different from said second reference voltage such that hysteresis is established for the operation of said electronic circuit relative to the voltage of said capacitor.

8. An electronic apparatus according to claim 1, wherein said voltage-comparing circuit includes an enable input coupled to said oscillation detecting circuit, said voltage-comparing circuit being disabled in response to said oscillation detecting circuit detecting that said oscillating circuit is in said oscillating state, and said voltage-comparing circuit being enabled in response to said oscillation detecting circuit detecting that said oscillating circuit is in a non-oscillating state.

9. An electronically-controlled timepiece according to claim 8, wherein the power generator is driven by a mechanical energy source engaged therewith via a mechanical energy transfer device; and the time indicator is connected to the mechanical energy transfer device, and the electronic circuit controls the power generator, thus regulating the speed of the time indicator.

10. A power supply control method for an electronic apparatus having a power supply, a capacitor for accumulating power from the power supply, an oscillation circuit, and an electronic circuit driven by power from the power supply, said method comprising:

a) initiating the supply of power from said capacitor to said electronic circuit in response to the voltage across said capacitor transitioning from a point below a first reference voltage to a point not lower than said first reference voltage;

b) maintaining the supply of power from said capacitor to said electronic circuit initiated in step (a) until said oscillation circuit transitions from an oscillating state to a non-oscillating state.

11. A power supply control method according to claim 10, wherein the power supply includes a power generator; said method further including:

ignoring said oscillation circuit in said step (a);

ignoring the voltage across said capacitor in step (b).

12. A power supply control method according to claim 10, wherein said oscillation circuit is supplied with power from said capacitor and is in said oscillating state when the voltage of said capacitor is not lower than a second reference voltage and is in said non-oscillating state when the voltage of said capacitor is lower than said second reference voltage; said method further including:

establishing a hysteresis operation for said electronic circuit relative to the voltage of said capacitor by selecting said first reference voltage to be different from said second reference voltage.

13. An electronic apparatus comprising:

a power supply;

a capacitor for accumulating power from said power supply;

an oscillation circuit;

an electronic circuit selectively coupled to be driven by power from said capacitor;

a first operation state detector for issuing a first control signal in response to detecting the transition of said capacitor from an operating state where its voltage is not less than a reference voltage to an operating state where its voltage is less than said reference voltage;

a second operation state detector for issuing a second control signal in response to detecting the transition of said oscillation circuit from a non-oscillating state of operation to an oscillating state of operation;

a power-supply-controlling unit for coupling said electric circuit to be driven by power from said capacitor in response to said first control signal, and for decoupling said electric circuit from said capacitor in response to said second control signal.

* * * * *

UNITED STATES PATENT AND TRADEMARK OFFICE
CERTIFICATE OF CORRECTION

PATENT NO. : 6,466,519 B1
DATED : October 15, 2002
INVENTOR(S) : Eisaku Shimizu et al.

It is certified that error appears in the above-identified patent and that said Letters Patent is hereby corrected as shown below:

Title page, Item [54] and Column 1, lines 1-3,
Title, change "ELECTRONIC DEVICE, ELECTRONIC TIMEPIECE AND POWER CONTROL METHOD" to -- ELECTRONIC APPARATUS, ELECTRONICALLY-CONTROLLED TIMEPIECE, AND POWER SUPPLY CONTROL METHOD --.

Column 17,
Lines 1-9, change the entire claim 8 to -- An electronically-controlled timepiece comprising an electronic apparatus as set forth in Claim 1, and a time indicator in which speed is regulated by the electronic circuit of the electronic apparatus --.

Signed and Sealed this

Twentieth Day of May, 2003

JAMES E. ROGAN
*Director of the United States Patent and Trademark Office*